(12) United States Patent
Chen et al.

(10) Patent No.: US 9,229,950 B2
(45) Date of Patent: Jan. 5, 2016

(54) METHOD AND DEVICE FOR PROCESSING FILES OF DISTRIBUTED FILE SYSTEM

(71) Applicant: Huawei Technologies Co., Ltd., Shenzhen, Guangdong (CN)

(72) Inventors: Shanxi Chen, Shenzhen (CN); Wei Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 230 days.

(21) Appl. No.: 13/676,559

(22) Filed: Nov. 14, 2012

(65) Prior Publication Data

US 2013/0073522 A1 Mar. 21, 2013

Related U.S. Application Data

(63) Continuation of application No. PCT/CN2011/073986, filed on May 12, 2011.

(30) Foreign Application Priority Data

Oct. 27, 2010 (CN) .......................... 2010 1 0522838

(51) Int. Cl.
*G06F 17/30* (2006.01)
(52) U.S. Cl.
CPC ................... *G06F 17/30194* (2013.01)
(58) Field of Classification Search
USPC .................... 707/636, 697, 696, 747
See application file for complete search history.

(56) References Cited

U.S. PATENT DOCUMENTS

| 5,390,327 | A | 2/1995 | Lubbers et al. |
| 7,360,030 | B1 | 4/2008 | Georgiev |
| 8,407,448 | B1 * | 3/2013 | Hayden et al. ................. 711/203 |
| 2002/0194209 | A1 * | 12/2002 | Bolosky et al. ............... 707/205 |
| 2004/0133570 | A1 | 7/2004 | Soltis |

(Continued)

FOREIGN PATENT DOCUMENTS

| CN | 101040282 A | 9/2007 |
| CN | 101158965 A | 4/2008 |

(Continued)

OTHER PUBLICATIONS $1^{st}$ Office Action in corresponding Chinese Patent Application No. 201010522838.9 (Jul. 4, 2012).

(Continued)

*Primary Examiner* — Usmaan Saeed
*Assistant Examiner* — Reza Hosseini
(74) *Attorney, Agent, or Firm* — Leydig, Voit & Mayer, Ltd.

(57) ABSTRACT

A method and device for processing files of distributed file system are disclosed, in which the method involves dividing the file into at least one data group according to the size of the file, and determining first mapping information from the file to the at least one data group, in which each of the at least one data group includes content blocks and verification block of file, and determining second mapping information from each of the at least one data group to data storage servers storing the each of the at least one data group (102), and providing the first mapping information and the second mapping information to a client for executing a writing operation of files (103). The technical solution can improve availability of memory space and decrease costs of constructing a distributed file system.

13 Claims, 8 Drawing Sheets

(56) References Cited

U.S. PATENT DOCUMENTS

| | | | |
|---|---|---|---|
| 2006/0053181 A1* | 3/2006 | Anand et al. | 707/204 |
| 2007/0276885 A1* | 11/2007 | Valiyaparambil et al. | 707/204 |
| 2011/0099351 A1* | 4/2011 | Condict | 711/216 |

FOREIGN PATENT DOCUMENTS

| | | |
|---|---|---|
| CN | 101488104 A | 7/2009 |
| CN | 101673271 A | 5/2010 |
| CN | 101727465 A | 6/2010 |

OTHER PUBLICATIONS

Search Report in corresponding Chinese Patent Application No. 201010522838.9 (Aug. 7, 2012).

Mogi et al., "Dynamic Parity Stripe Reorganizations for RAID5 Disk Arrays," 1994, Institute of Industrial Science, The University of Tokyo, Japan.

Ghemawat et al, "The Google File System," SOSP, Oct. 19-22, 2003, ACM, New York, New York.

International Search Report in corresponding International Patent Application No. PCT/CN2011/073986 (Aug. 4, 2011).

* cited by examiner

METHOD AND DEVICE FOR PROCESSING FILES OF DISTRIBUTED FILE SYSTEM

CROSS-REFERENCE TO RELATED APPLICATION

This application is a continuation of International Patent Application No. PCT/CN2011/073986, filed on May 12, 2011, which claims priority to Chinese Patent Application No. 201010522838.9, filed on Oct. 27, 2010, both of which are hereby incorporated by reference in their entireties.

FIELD OF THE INVENTION

The present invention relates to the field of storage technology, and more particularly to a method and a device for processing files of a distributed file system.

BACKGROUND OF THE INVENTION

The file system's functions contained in the existing operating systems are responsible for organizing persistent contents required by the systems, applications and the final users, storing the contents in a local storage device, and providing such functions as reading, modifying, deleting and transferring the persistent contents under control of access permissions. With the development of storage and network technologies, file systems are greatly changed in terms of its composition and base for implementation.

The prior art has provided a distributed file system that stores multiple copies of each block of a file that is under its management, so as to ensure reliability of the file contents. As long as any copy is valid in the entire system, the data represented by that copy is valid, and a user can successfully access to the data. The reliable manner provided by independent copies belongs to the parallel system amongst reliability models. The parallel system is a system of enhanced reliability for providing reliability in parallel.

However, in order to ensure higher reliability, the aforementioned prior-art technology divides a file into blocks and subsequently stores the blocks in a plurality of data storage servers in direct redundancy mode, whereby the storage space utilization becomes low, thus bringing about high cost for system construction. Specifically when individual data storage server costs much, direct redundancy causes higher cost such that it is difficult to construct the system.

SUMMARY OF THE INVENTION

Embodiments of the present invention provide a method for processing files of a distributed file system, to enhance the storage space utilization and to lower the construction cost of the distributed file system. The method comprises dividing a file into at least one data group according to the size of the file, and determining first mapping information from the file to the at least one data group, wherein each of the at least one data group includes content blocks of the file and verification block; determining second mapping information from each of the at least one data group to data storage servers storing the each of the at least one data group; and providing the first mapping information and the second mapping information to a client for executing a writing operation of the file.

Embodiments of the present invention further provide a method for processing files of a distributed file system, to enhance the storage space utilization and to lower the construction cost of the distributed file system. The method comprises obtaining first mapping information from a file to at least one data group and second mapping information from each of the at least one data group to data storage servers storing the each of the at least one data group, wherein the at least one data group is formed by dividing the file according to the size of the file, and each of the at least one data group includes content blocks of the file and verification block; performing content block partitioning on the file according to the first mapping information to generate the content blocks of the file; generating the verification block of each of the at least one data group according to the first mapping information; and sending the generated content block and verification block to the data storage servers for storage according to the second mapping information.

Embodiments of the present invention also provide a method for processing files of a distributed file system, to enhance usability of the distributed file system in the case the storage space utilization of the distributed file system is relatively high and the construction cost of the distributed file system is relatively low. The method comprises obtaining relevant information of a recovery path by a data storage server on the recovery path, wherein the recovery path is generated according to a valid block in a data group to which a lost block belongs, a data storage server storing the valid block, and a substitute data storage server selected for a failed data storage server, wherein the last data storage server on the recovery path is the substitute data storage server, and the lost block is stored in the failed data storage server; and calculating the lost block by the data storage server on the recovery path according to the relevant information of the recovery path and storing the calculated lost block.

Embodiments of the present invention still provide a metadata server of a distributed file system, to enhance the storage space utilization and to lower the construction cost of the distributed file system. The metadata server comprises a data group dividing module configured to divide a file into at least one data group according to the size of the file, and determine first mapping information from the file to the at least one data group, wherein each of the at least one data group includes content blocks of the file and verification block; a storage mapping determining module configured to determine second mapping information from each of the at least one data group to data storage servers storing the each of the at least one data group; and a metadata maintaining module configured to provide the first mapping information and the second mapping information to a client for executing a writing operation of the file.

Embodiments of the present invention further provide a client of a distributed file system, to enhance the storage space utilization and to lower the construction cost of the distributed file system. The client comprises a file processing module configured to obtain first mapping information from a file to at least one data group and second mapping information from each of the at least one data group to data storage servers storing the each of the at least one data group, wherein the at least one data group is formed by dividing the file according to the size of the file, and each of the at least one data group includes content blocks of the file and verification block, and perform content block partitioning on the file according to the first mapping information to generate the content blocks of the file; a redundancy verifying module configured to generate the verification block of each of the at least one data group according to the first mapping information; and a block reading and writing module configured to send the generated content block and verification block to the data storage servers for storage according to the second mapping information.

Embodiments of the present invention still provide a data storage server of a distributed file system, to enhance to enhance usability of the distributed file system in the case the storage space utilization of the distributed file system is relatively high and the construction cost of the distributed file system is relatively low. The data storage server comprises a recovery path information obtaining module configured to obtain relevant information of the recovery path, wherein the recovery path is generated according to a valid block in a data group to which a lost block belongs, a data storage server storing the valid block, and a substitute data storage server selected for a failed data storage server, wherein the last data storage server on the recovery path is the substitute data storage server, and the lost block is stored in the failed data storage server; and a lost block processing module configured to calculate the lost block according to the relevant information of the recovery path and store the calculated lost block.

Embodiments of the present invention also provide a distributed file system, to enhance the storage space utilization and to lower the construction cost of the distributed file system. The distributed file system comprises a metadata server configured to divide a file into at least one data group according to the size of the file, determine first mapping information from the file to the at least one data group, wherein each of the at least one data group includes content blocks of the file and verification block, determine second mapping information from each of the at least one data group to data storage servers storing the each of the at least one data group, and send the first mapping information and the second mapping information; a client configured to obtain the first mapping information and the second mapping information sent by the metadata server, perform content block partitioning on the file according to the first mapping information to generate the content blocks of the file, generate the verification block of each of the at least one data group according to the first mapping information, and send the generated content block and verification block according to the second mapping information; and a data storage server configured to receive and store the content block and the verification block sent by the client.

In the embodiments of the present invention, a file is divided into at least one data group according to the size of the file, wherein each of the at least one data group includes content blocks of the file and verification block, first mapping information from the file to the at least one data group and second mapping information from each of the at least one data group to data storage servers storing the each of the at least one data group are constructed, and a client generates content blocks of the file and verification block of each of the at least one data group according to the first mapping information, and stores the content block and the verification block in a corresponding data storage server according to the second mapping information. In comparison with the prior-art technology in which multiple copies of a file are stored, the storage space utilization can be greatly enhanced, and construction cost of the distributed file system can be lowered.

In the embodiments of the present invention, recovery of the distributed file system is realized by means of a recovery path, on which a data storage server carries out calculation of a lost block and stores the calculated block without having to update data groups, as it suffices to calculate the lost block according to a valid block in the data group, whereby it is possible to avoid a significant amount of reading, writing and computing operations, and to enhance usability of the distributed file system in the case the storage space utilization of the distributed file system is relatively high and the construction cost of the distributed file system is relatively low.

BRIEF DESCRIPTION OF THE DRAWINGS

In order to more clearly describe the technical solutions of the prior art or the embodiments of the present invention, the drawings to be used in the descriptions of the prior art or the embodiments are briefly introduced as follows. Obviously, the following drawings just illustrate some embodiments of the present invention, and a person skilled in the art can obtain other drawings from these drawings without paying a creative effort.

DETAILED DESCRIPTION OF THE INVENTION

To make the objectives, technical solutions and advantages of the embodiments of the present invention clearer, description will be made in greater detail below to explain the embodiments of the present invention with reference to the accompanying drawings. The exemplary embodiments of the present invention and explanations thereof are herein employed to explain, rather than restrict, the present invention.

Figure 1:
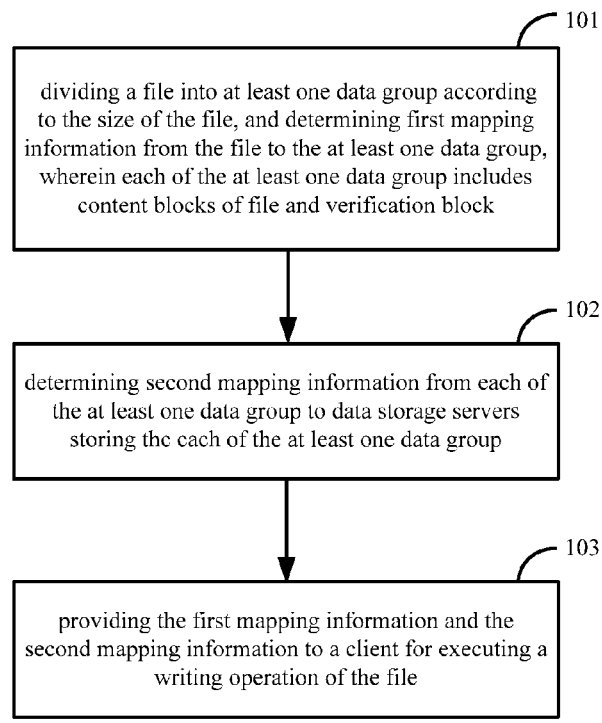
FIG. 1 is a flowchart illustrating the method for processing files of a distributed file system in the embodiments of the present invention.

As shown in FIG. 1, in the embodiments of the present invention, the method for processing files of a distributed file system may include the following steps:

Step 101: dividing a file into at least one data group according to the size of the file, and determining first mapping information from the file to the at least one data group, wherein each of the at least one data group includes content blocks of the file and verification block.

Step 102: determining second mapping information from each of the at least one data group to data storage servers storing the each of the at least one data group.

Step 103: providing the first mapping information and the second mapping information to a client for executing a writing operation of the file.

As can be known according to the flow shown in FIG. 1, in the embodiments of the present invention, a file is divided into at least one data group according to the size of the file, wherein each of the at least one data group includes content blocks of the file and verification block, first mapping information from the file to the at least one data group and second mapping information from each of the at least one data group to data storage servers storing the each of the at least one data group are constructed, and the first mapping information and the second mapping information are provided to the client for executing a writing operation of the file. In comparison with the prior-art technology in which multiple copies of a file are stored, the storage space utilization can be greatly enhanced, and construction cost of the distributed file system can be lowered.

Comparatively speaking, if the prior-art technical solution, in which multiple copies of a file are stored, stores each block of a managed file as N copies, the storage space utilization will be 1/N. By contrast, in the embodiments of the present invention, the content blocks of a file and the verification block are selected to form a data group for management of the file, and the data group includes N content blocks of the file and a verification block generated for the N content blocks. Such a data group can be referred to as an N+1 data group, and the storage space utilization can reach up to N/(N+1). This makes it possible to greatly lower the construction cost of a distributed file system consisting of data storage server hardware of relatively high reliability.

Moreover, in the embodiments of the present invention, the file is divided into at least one data group according to the size of the file, and the number of data groups is flexibly variable and the blocks are related to the file content, thus being adapted to the development demand for flexible variation of the distributed file system. The number of blocks of any data group is variable in the distributed file system according to the embodiments of the present invention.

The blocks of any given data group are stored only in one file.

The number of blocks of data groups within files is decided by the sizes of the files.

Figure 2:
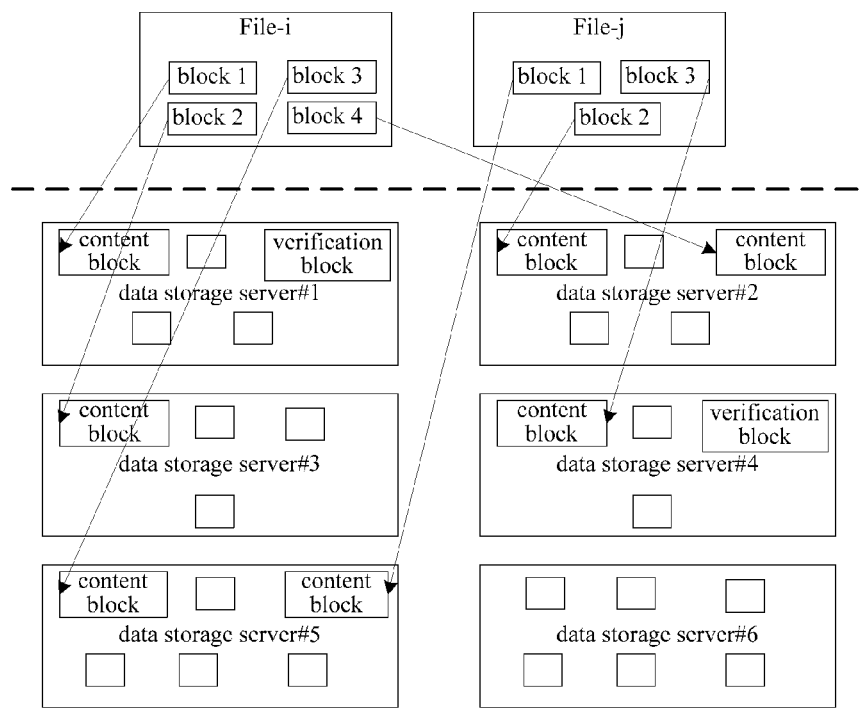
FIG. 2 is a schematic diagram exemplarily illustrating formation of data groups in the embodiments of the present invention.

Accordingly, each file may have redundancy different from those of the other files in the embodiments of the present invention. As shown in FIG. 2, the data group of File-i includes four content blocks of file and one verification block. This data group is of a (4+1) redundancy, and the utilization of the system storage space occupied by this data group is 80%; the data group of File-j includes three content blocks of file and one verification block. This data group is of a (3+1) redundancy, and the utilization of the system storage space occupied by this data group is 75%.

The flow shown in FIG. 1 may be realizable by a device capable of realizing the function thereof, and such a device is for instance a metadata server. The following embodiment is explained with a metadata server realizing the flow shown in FIG. 1 as an example.

In one implementation, when a file is divided into at least one data group according to the size of the file and first mapping information from the file to the at least one data group is determined, it is possible to firstly calculate the number of the content blocks of the file according to the size of the file and the size of a block, and subsequently to determine the number and composition of the at least one data group according to the number of the content blocks of the file and a preset limit value of the number of blocks within a data group.

For instance, the number of content blocks of a file can be calculated according to the following formula:

$$c=(m+b-1)/b,$$

wherein m is the size of the file, b is the size of a block, and c is the number of content blocks of the file.

The step of determining the number and composition of the at least one data group according to the number of content blocks of a file and a preset limit value of the number of blocks within a data group includes:

if $c<k$, it is determined that the number of the at least one data group is one, and that the data group is composed of c content blocks, k–c blank blocks and one verification block;

if $c \geq K$, it is determined that the number of the at least one data group is $g=(c+K-2)/(K-1)$, wherein the first g–1 data groups are composed of K–1 content blocks and one verification block; the last data group is composed of content blocks, blank blocks and verification block, wherein the number of the content blocks is smaller than K–1, and the number of the verification block is one;

wherein (k, K) is the preset limit value of the number of blocks within a data group, k is the lower limit value of the number of blocks within a data group, and K is the upper limit value of the number of blocks within a data group.

The number and composition of these data groups form the management metadata of the file. The aforementioned (k, K) can be set based on different demands on reliability and performance of specific application environments. With respect to a distributed file system consisting of independent storage server hardware with relatively low reliability, if it is needed for this system to provide higher reliability, smaller values can be used for the limit value (k, K) of the number of blocks within a data group. With respect to a distributed file system consisting of independent storage server hardware with relatively high reliability, if it is needed for this system to provide higher reliability, larger values can be used for the limit value (k, K) of the number of blocks within a data group.

Figure 3:
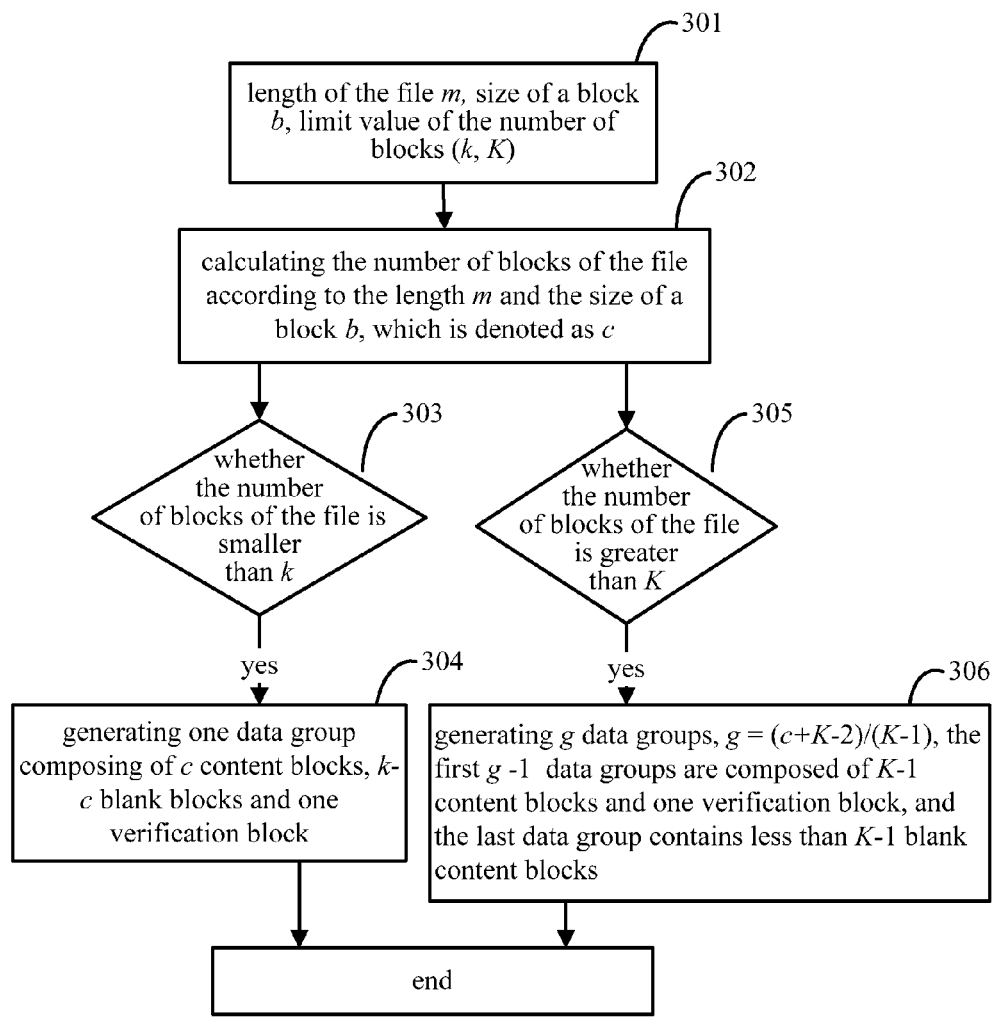
FIG. 3 is a flowchart illustrating the division of a file into at least one data group according to the size of the file in the embodiments of the present invention.

As shown in FIG. 3, the process flow of dividing a file into at least one data group according to the size of the file may include:

Step 301: inputting the size of the file m, the size of a block b, and the preset limit value (k, K) of the number of blocks within a data group.

Step 302: calculating the number of content blocks c=(m+b–1)/b according to the size of the file m and the size of a block b; and performing Steps 303 and 305.

Step 303: determining whether the number of content blocks c of the file is smaller than k; if yes, performing Step 304.

Step 304: generating one data group composing of c content blocks, k-c blank blocks and one verification block, and terminating the flow.

Step 305: determining whether the number of content blocks c of the file is greater than or equal to K; if yes, performing Step 306.

Step 306: generating g data groups, g=(c+K−2)/(K−1), wherein the first g−1 data groups are composed of K−1 content blocks and one verification block; the last data group is composed of content blocks, blank blocks and a verification block, wherein the number of the content blocks is smaller than K−1, and the number of the verification block is one; and terminating the flow.

In one implementation, while determining second mapping information from each of the at least one data group to the data storage servers storing the each of the at least one data group, it is possible to determine that different blocks of the same data group are stored in different data storage servers, and/or that different data groups reuse a data storage server.

Storing different blocks of the same data group in different data storage servers can prevent the situation in which even more blocks of the same data group are lost when one data storage server becomes failed, thus causing computational complexity for recovering the lost blocks. Of course, it is also possible to store different blocks of the same data group in the same data storage server in implementations.

Reuse of a data storage server by different data groups makes it possible to enhance the space utilization of the data storage server, and hence to further reduce the data used of the data storage server and to lower the construction cost of the system.

Figure 4:
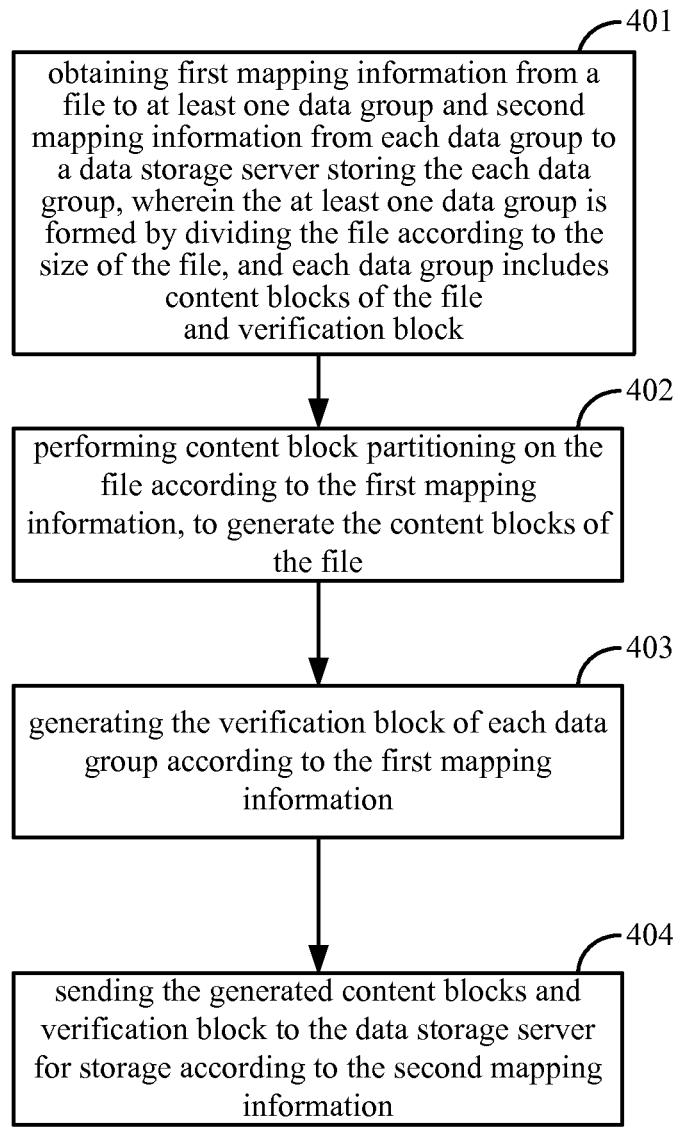
FIG. 4 is a flowchart illustrating another method for processing files of a distributed file system in the embodiments of the present invention.

As shown in FIG. 4, embodiments of the present invention further provide a method for processing files of a distributed file system, the process flow of the method may include:

Step 401: obtaining first mapping information from a file to at least one data group and second mapping information from each of the at least one data group to data storage servers storing the each of the at least one data group, wherein the at least one data group is formed by dividing the file according to the size of the file, and each of the at least one data group includes content blocks of the file and a verification block.

Step 402: performing content block partitioning on the file according to the first mapping information to generate the content blocks of the file.

Step 403: generating the verification block of each of the at least one data group according to the first mapping information.

Step 404: sending the generated content block and verification block to the data storage servers for storage according to the second mapping information.

As can be known according to the flow shown in FIG. 4, in comparison with the prior-art technology in which a file is stored as a duplicate, generating content blocks of a file and the verification block of each of the at least one data group according to the first mapping information and storing the content blocks and the verification block in a corresponding data storage server according to the second mapping information as disclosed in the embodiments of the present invention may greatly improve the utilization ratio of the storage space, and lower the construction cost of the distributed file system. Moreover, since a file is divided into a data group according to the size of the file, the number of data groups is flexibly variable and the blocks are related to the file content, thus being adapted to the development demand for flexible variation of the distributed file system.

The flow shown in FIG. 4 may be realizable by a device capable of realizing the function thereof, and such a device is for instance a client. The following embodiment is explained with a client realizing the flow shown in FIG. 4 as an example.

Figure 5:
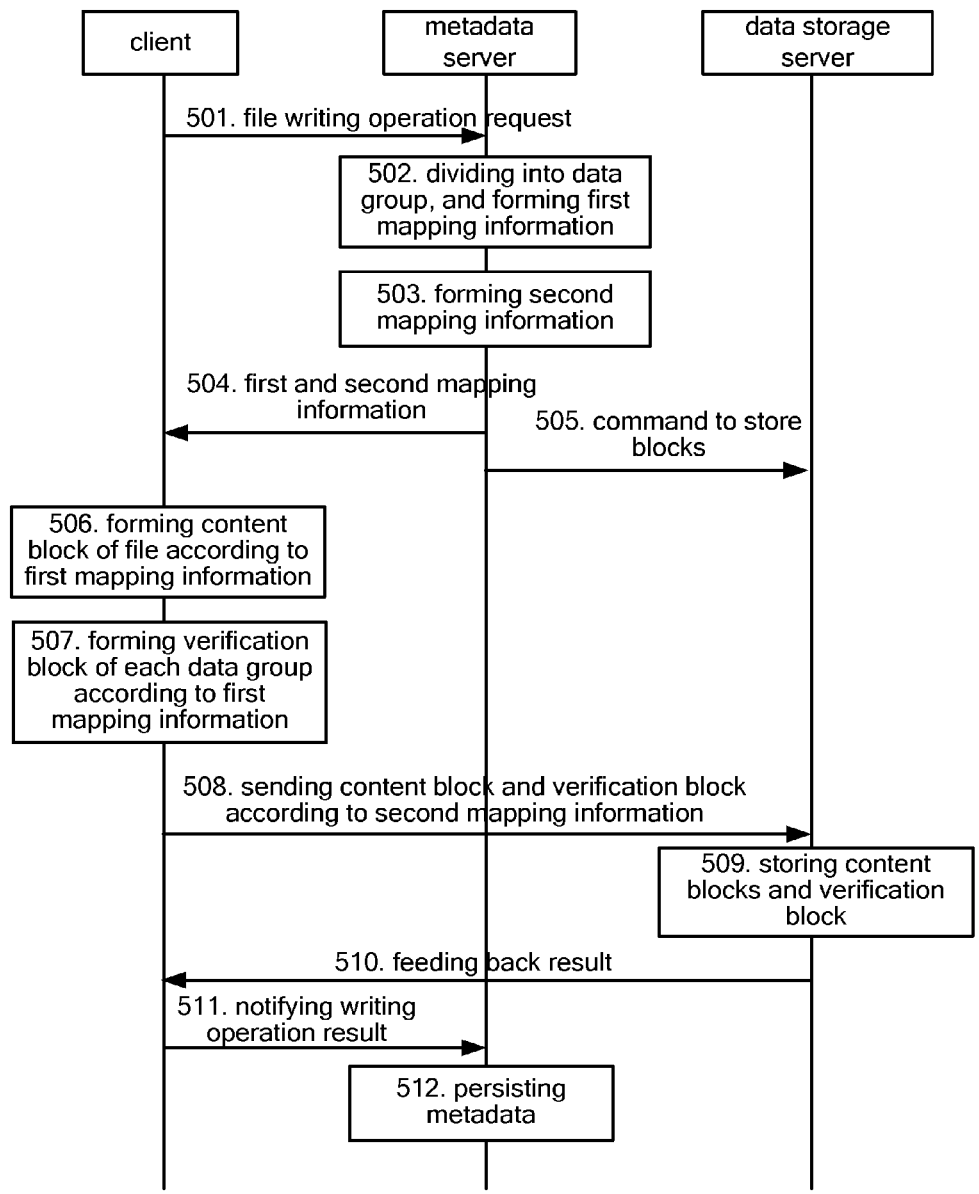
FIG. 5 is a schematic diagram exemplarily illustrating the file writing process in the embodiments of the present invention.

An example is taken below to explain the file writing process in the embodiments of the present invention. As shown in FIG. 5, the process may include:

Step 501: the client sends a file writing operation request to a metadata server.

Step 502: on receipt of the file writing operation request, the metadata server obtains information of the file to be written, including the size of the file, etc., divides the file into at least one data group according to the size of the file, and forms first mapping information from the file to the at least one data group.

Step 503: the metadata server determines a data storage server that stores the data group according to such information as capacity, utilization ratio of storage space, and network traffic of each data storage server, and forms second mapping information from each of the at least one data group to the data storage servers storing the each of the at least one data group.

In one implementation, different blocks of the same data group can be stored in different data storage servers, and different data groups can reuse a data storage server.

Step 504: the metadata server feeds the first mapping information and the second mapping information back to the client.

Step 505: the metadata server sends a command to corresponding data storage servers indicating that blocks are about to be stored, wherein such information as size of the blocks can be provided to these data storage servers.

Step 506: on receipt of the first mapping information and the second mapping information, the client performs content blocking on the file according to the first mapping information to generate content blocks of the file.

Step 507: the client generates a verification block of each of the at least one data group according to the first mapping information.

Step 508: the client sends the generated content blocks and verification block to the data storage servers for storage according to the second mapping information.

While sending the content blocks and the verification block, the client may as well send such information as identification of these blocks.

Step 509: on receipt of the blocks and the identification of the blocks, the data storage server performs local storing, wherein the data storage server may also create a mapping relation between the blocks and the identification thereof and the local position where the blocks and the identification thereof are stored.

Step 510: on successful operation, the data storage server informs the client that the contents of the blocks have been stored.

Step 511: the client collects from the corresponding data storage server the result of storing the blocks in this operation, and informs the metadata server of the result.

Step 512: on receipt of information indicating a successful operation from the client, the metadata server performs persistence on such information of the file as the first mapping information and the second mapping information as metadata, thus it is possible for the client to return the result of the writing operation of the file to an application of the upper layer; if what the client reports to the metadata server is a result of failure, the metadata server removes such temporary information in the file operating process as the first mapping information and the second mapping information of the file.

In one implementation, after obtaining the first mapping information and the second mapping information provided by the metadata server, the client may also cache the first mapping information and the second mapping information. By such caching mechanism, communication traffic between the client and the metadata server can be reduced.

In one implementation, the distributed file system according to the embodiments of the present invention may also carry out a data recovering process. In the implementation, the metadata server may determine a lost block stored in a failed data storage server according to the first mapping information and the second mapping information, select a substitute data storage server for the ineffective data storage server, and generate a recovery path according to an valid block in the data group to which the lost block belongs, the data storage server storing the valid block, and the substitute data storage server, such that a data storage server on the recovery path may calculate the lost block and store the calculated lost block.

Specifically, the first data storage server on the recovery path provides the locally stored valid block as data content to the second data storage server on the recovery path; the second data storage server on the recovery path calculates the locally stored valid block and the received data content, and provides the calculated data content to the third data storage server on the recovery path; the process goes so on and so forth until the last data storage server on the recovery path serving as the substitute data storage server stores the received data content as the lost block.

Figure 6:
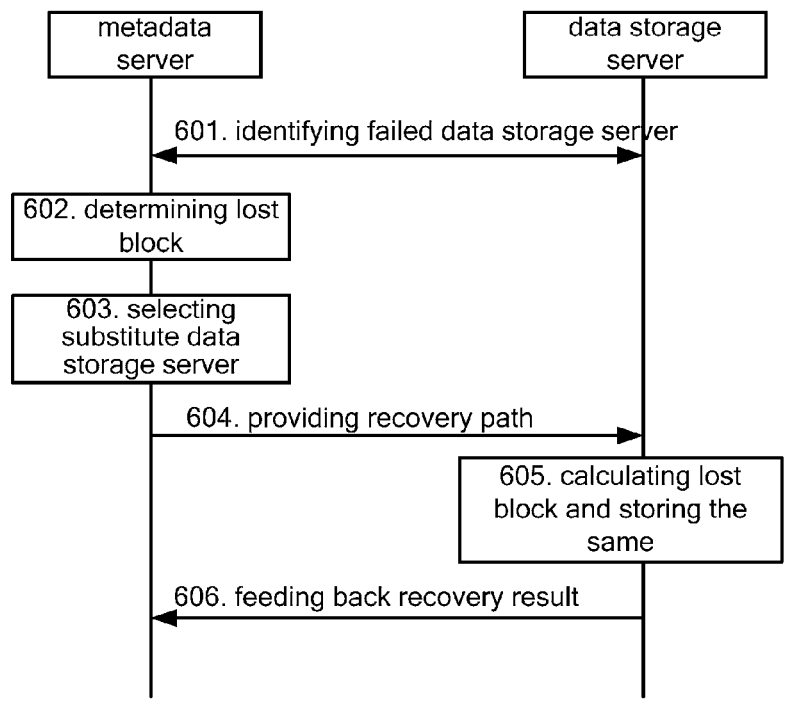
FIG. 6 is a schematic diagram exemplarily illustrating the data recovering process in the embodiments of the present invention.

An example is taken below to explain the data recovering process in the embodiments of the present invention. As shown in FIG. 6, the process may include:

Step 601: a metadata server recognizes occurrence of a data storage server becoming ineffective by using a heartbeat method.

Step 602: the metadata server determines a lost block stored in the ineffective data storage server according to first mapping information and second mapping information in stored metadata.

Step 603: the metadata server selects a substitute data storage server for the ineffective data storage server.

Step 604: the metadata server generates a recovery path according to an valid block in the data group to which the lost block belongs, the data storage server storing the valid block, and the substitute data storage server, and notifies to send a recovery command to the relevant data storage server according to the recovery path, wherein the recovery path is a data storage server vector composed of the data storage server storing the valid block and the substitute data storage server, and wherein the substitute data storage server is located at an 1 end of the vector.

Step 605: each data storage server selected by the metadata server and on the recovery path all participate in the recovering process.

The first data storage server on the recovery path provides the locally stored valid block as data content to the second data storage server on the recovery path.

The second data storage server on the recovery path calculates the locally stored valid block and the received data content, and provides the calculated data content to the third data storage server on the recovery path.

The process goes so on and so forth until the last data storage server on the recovery path serving as the substitute data storage server stores the received data content as the lost block, generate metadata information, and report the recovering result to the metadata server.

Step 606: on receipt of the recovering result from the substitute data storage server, the metadata server performs persistence on the relevant metadata information of the substitute data storage server.

Figure 7:
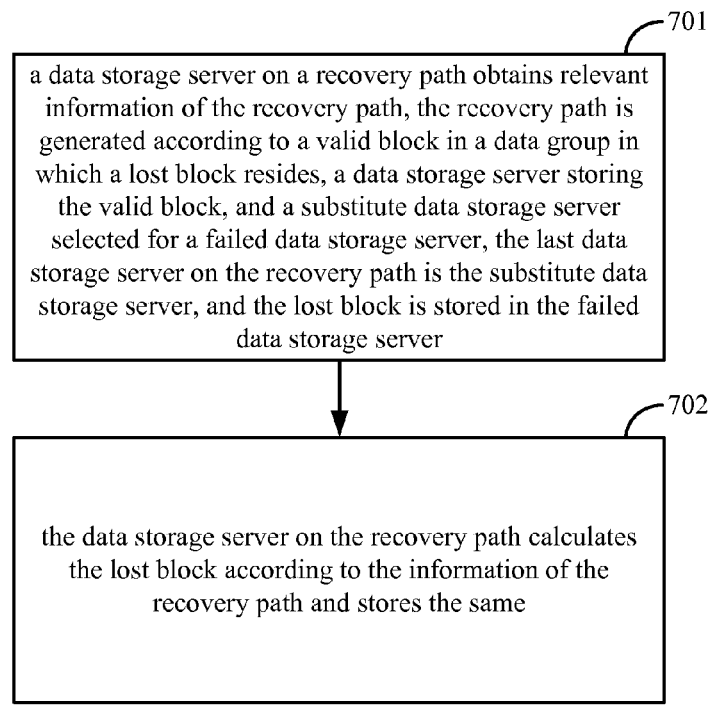
FIG. 7 is a flowchart illustrating still another method for processing files of a distributed file system in the embodiments of the present invention.

For the data storage server, embodiments of the present invention provide a method for processing files, namely a process in the data recovering. As shown in FIG. 7, the process may include:

Step 701: a data storage server on a recovery path obtains relevant information of the recovery path, wherein the recovery path is generated according to an valid block in a data group to which a lost block belongs, a data storage server storing the valid block, and a substitute data storage server selected for a failed data storage server; the last data storage server on the recovery path is the substitute data storage server, and the lost block is stored in the ineffective data storage server.

Step 702: the data storage server on the recovery path calculates the lost block according to the relevant information of the recovery path and stores the calculated lost block.

In one implementation, Step 702 may include:

providing, by the first data storage server on the recovery path, a locally stored valid block as data content to the next data storage server on the recovery path;

calculating, by the data storage server(s) on the recovery path other than the first and the last data storage servers on the recovery path, the locally stored valid block and the received data content, and providing the calculated data content to the next data storage server on the recovery path; and storing, by the last data storage server on the recovery path, the received data content as the lost block.

In one implementation, the last data storage server on the recovery path may further generate metadata information of the lost block after storing the lost block, and feed the metadata information back to the metadata server.

Seen as such, in the embodiments of the present invention, recovery of the distributed file system is realized by means of a recovery path, on which a data storage server calculates a lost block and stores the same without having to update data groups, as it suffices to calculate the lost block according to an valid block in the data group, whereby it is possible to avoid great amount of reading, writing and computing operations, and to enhance usability of the distributed file system in the case the utilization ratio of the storage space of the distributed file system is relatively high and the construction cost of the distributed file system is relatively low.

Figure 8:
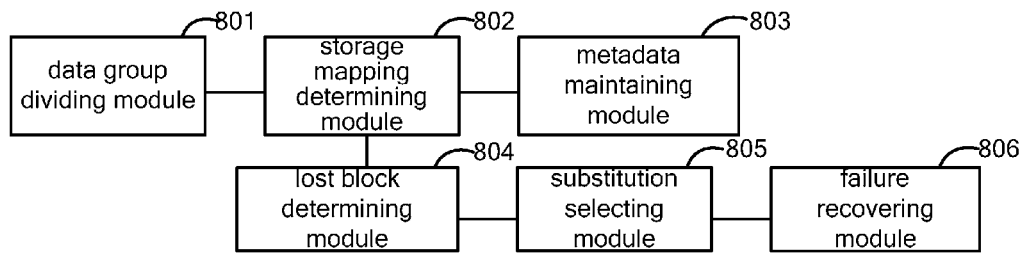
FIG. 8 is a view illustrating the structure of a metadata server of the distributed file system in the embodiments of the present invention.

Based on the same inventive thinking, the present invention further provides a metadata server of a distributed file system. As shown in FIG. 8, the metadata server includes:

a data group dividing module 801, configured to divide a file into at least one data group according to a size of the file, and determine first mapping information from the file to the at least one data group, wherein each of the at least one data group includes content blocks of the file and a verification block;

a storage mapping determining module 802, configured to determine second mapping information from each of the at least one data group to data storage servers storing the each of the at least one data group; and a metadata maintaining module 803, configured to provide the first mapping information and the second mapping information to a client for executing a writing operation of the file.

In one embodiment, the data group dividing module 801 may include:

a calculating unit, configured to calculate the number of content blocks of the file according to the size of the file and a size of a block; and a determining unit, configured to determine the number and composition of the at least one data group according to the number of content blocks of the file and a preset limit value of the number of blocks within a data group.

In one embodiment, the calculating unit can be specifically configured to calculate the number of content blocks of the file according to the following formula:

$$c=(m+b-1)/b;$$

wherein m is the size of the file, b is the size of a block, and c is the number of content blocks of the file.

The determining unit can be specifically configured to:

if c<k, determine that the number of the at least one data group is one, and that the data group is composed of c content blocks, k−c blank blocks and one verification block;

if c≥K, determine that the number of the at least one data group is g=(c+K−2)/(K−1) wherein the first g−1 data groups are composed of K−1 content blocks and one verification block; and the last data group is composed of content blocks, blank blocks and verification block, wherein the number of the content blocks is smaller than K−1, and the number of the verification block is one;

wherein (k, K) is the preset limit value of the number of blocks within a data group.

In one embodiment, the storage mapping determining module 802 can be specifically configured to:

while determining second mapping information from each of the at least one data group to data storage servers storing the each of the at least one data group, determine that different blocks of the same data group are stored in different data storage servers; and/or determine that different data groups reuse a data storage server.

In one embodiment, the metadata server shown in FIG. 8 may further include:

a lost block determining module 804, configured to determine a lost block stored in a failed data storage server according to the first mapping information and the second mapping information;

a substitution selecting module 805, configured to select a substitute data storage server for the failed data storage server; and a failure recovering module 806, configured to generate a recovery path according to a valid block in the data group to which the lost block belongs, the data storage server storing the valid block, and the substitute data storage server, wherein the recovery path is used for data storage servers on the recovery path to calculate the lost block and for the substitute data storage server to store the calculated lost block.

Comparison is made below with the prior art to explain improvement of the metadata server of the distributed file system in the embodiments of the present invention over the prior-art technical solution in which a file is stored by replication.

Figure 9:
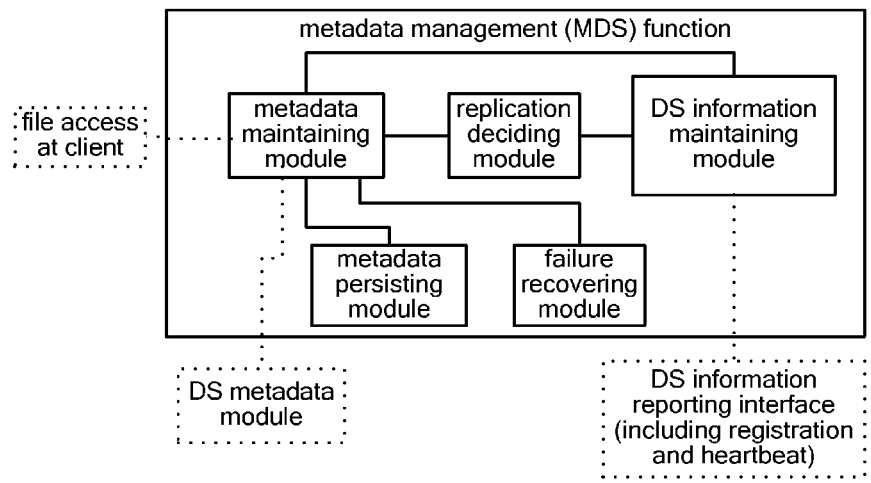
FIG. 9 is a schematic diagram exemplarily illustrating a metadata server in a technical solution in which a file is stored as a duplicate in the embodiments of the present invention.

As shown in FIG. 9, in the prior-art technical solution in which multiple copies of a file are stored, a metadata server includes:

a metadata maintaining module, configured to realize space management and maintenance of user logical files, and mapping information from these files to blocks managed by the system and to servers storing the blocks;

a metadata persisting module, configured to persist the metadata on a permanent storage, and forming snapshot data of file information;

a replication deciding module, configured to decide in which data storage servers the data blocks of a file to be written should be stored according to such information as number and capacity of allocated data storage (DS) servers and the utilization thereof during system running;

a failure recovering module, configured to maintain a fixed replication factor for each data block, wherein on receipt of information indicating failure of a certain DS, the replication factors of the data blocks are verified, and for those data blocks whose replications are lost due to failure of the DS, it is necessary to trigger on the replication deciding module to reselect a new DS that stores these replications; and a DS information maintaining module, configured to be responsible for a joining and leaving procedures of the DS, report the information to the metadata maintaining module, and be responsible for collecting information concerning CPU, storage space utilization and network traffic of each DS, so as to support the functioning of the replication deciding module.

Figure 10:
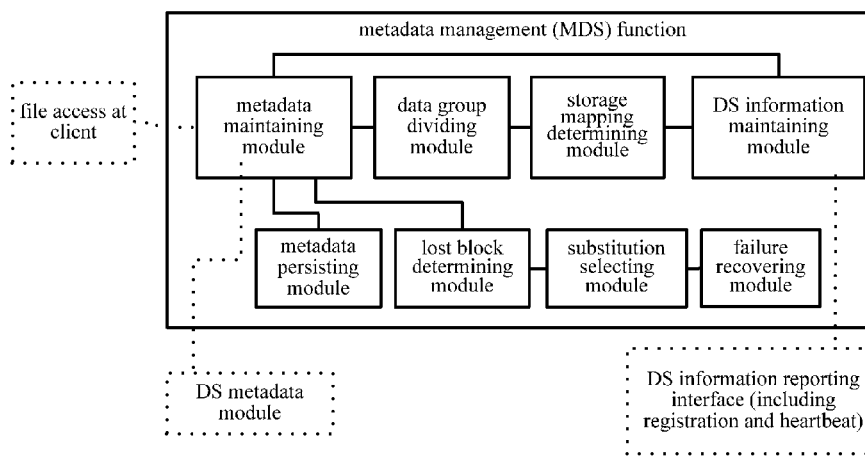
FIG. 10 is a schematic diagram exemplarily illustrating a concrete example of a metadata server in the embodiments of the present invention.

As shown in FIG. 10, the metadata server according to the embodiments of the present invention differs from that in the prior-art technical solution in which the file is stored by replication in the following aspects:

Embodiments of the present invention provide a data group dividing module for dividing a file into at least one data group depending on the size of the file, so as to form redundancy of a N/(N+1) voting module in the system internal management, and simultaneously provide a storage mapping determining module configured to realize the function of determining the second mapping information, and a metadata maintaining module configured to realize the function of providing the first mapping information and the second mapping information to the client for executing the writing operation of the file.

Embodiments of the present invention further enhance the function of the failure recovering module using the lost block determining module, the substitution selecting module, and the failure recovering module, as compared to the failure recovering module of the prior-art technical solution in which multiple copies of a file is stored. The aim thereof is to ensure reliability of data content in system management, but an entirely different failure recovering method is employed thereby to base on the redundancy of the N/(N+1) voting module to generate a recovery path, on which data storage servers recover lost data blocks of all affected data groups through calculation.

Figure 11:
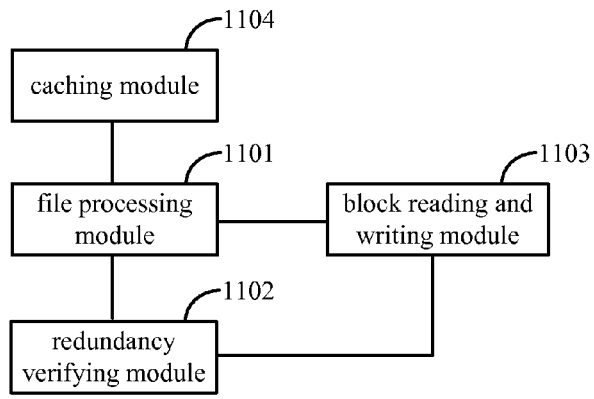
FIG. 11 is a view illustrating the structure of a client of the distributed file system in the embodiments of the present invention.

Based on the same inventive thinking, the present invention further provides a client of a distributed file system. As shown in FIG. 11, the client includes:

a file processing module 1101, configured to obtain first mapping information from a file to at least one data group and second mapping information from each of the at least one data group to data storage servers storing the each of the at least one data group, wherein the at least one data group is formed by dividing the file according to the size of the file, and each of the at least one data group includes content blocks of the file and a verification block; and perform content block partitioning on the file according to the first mapping information to generate the content blocks of the file;

a redundancy verifying module 1102, configured to generate the verification block of each of the at least one data group according to the first mapping information; and a block reading and writing module 1103, configured to send the generated content blocks and verification block to the data storage servers for storage according to the second mapping information.

In one embodiment, the client shown in FIG. 11 may also include a caching module 1104 configured to cache the first mapping information and the second mapping information.

Comparison is made below with the prior art to explain improvement of the client of the distributed file system in the embodiments of the present invention over the prior-art technical solution in which multiple copies of a file are stored.

Figure 12:
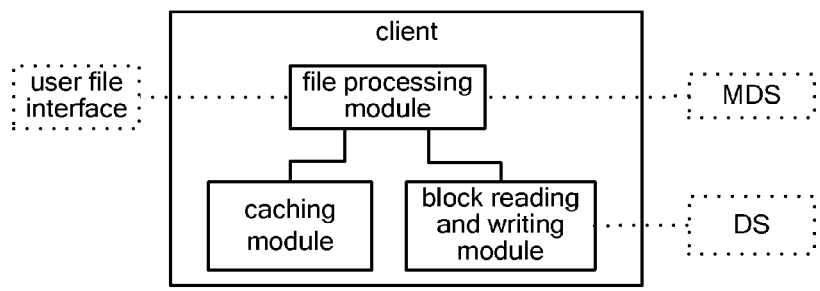
FIG. 12 is a schematic diagram exemplarily illustrating a client in a technical solution in which a file is stored as a duplicate in the embodiments of the present invention.

As shown in FIG. 12, in the prior-art technical solution in which the file is stored as a duplicate, a client includes:

a file processing module, configured to process a file invoking request from an application and return a file operation result, be a central module of the client, be responsible for sending to a metadata server (MDS) information relevant to request for operating the file, transfer the relevant information to a block reading and writing module and obtain operation result of each block of the file, and be responsible for connecting metadata of the file at a remote MDS to a local cache;

a caching module, configured to maintain the cache of metadata of files recently processed by the client, making it possible to greatly reduce communication traffic between the client and the MDS by means of certain cache invalidation policy or mechanism, and maximally maintain consistency of the entire system; and a block reading and writing module, configured to be responsible for the reading operation of final content blocks of the file in each DS.

Figure 13:
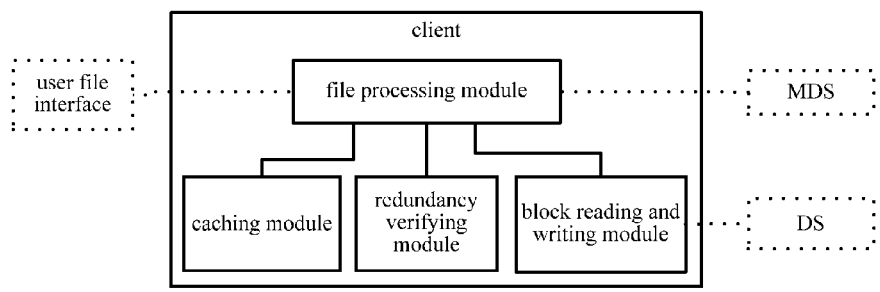
FIG. 13 is a schematic diagram exemplarily illustrating a concrete example of a client in the embodiments of the present invention.

As shown in FIG. 13, the metadata server according to the embodiments of the present invention differs from that in the prior-art technical solution in which multiple copies of a file are stored in the following aspect.

The client according to the embodiments of the present invention is further provided with a redundancy verification module for use in the process of generating contents of the redundancy verification block on completion of writing by the client.

Figure 14:
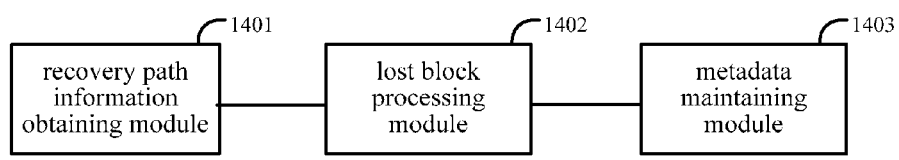
FIG. 14 is a view illustrating the structure of a data storage server of the distributed file system in the embodiments of the present invention.

Based on the same inventive thinking, the present invention further provides a data storage server of a distributed file system. As shown in FIG. 14, the data storage server is located on a recovery path and includes:

a recovery path information obtaining module 1401, configured to obtain relevant information of the recovery path; the recovery path is generated according to a valid block in a data group to which a lost block belongs, a data storage server storing the valid block, and a substitute data storage server selected for a failed data storage server; the last data storage server on the recovery path is the substitute data storage server, and the lost block is stored in the failed data storage server; and a lost block processing module 1402, configured to calculate the lost block according to the relevant information of the recovery path and store the calculated lost block.

In one embodiment, if the data storage server is the first data storage server on a recovery path, the lost block processing module 1402 is specifically configured to provide a locally stored valid block as data content to the next data storage server on the recovery path.

If the data storage server is any data storage server on the recovery path except the first and the last data storage servers on the recovery path, the lost block processing module 1402 is specifically configured to calculate the locally stored valid block and the received data content, and provide the calculated data content to the next data storage server on the recovery path.

If the data storage server is the last data storage server on the recovery path, the lost block processing module 1402 is specifically configured to store the received data content as the lost block.

In one embodiment, if the data storage server is the last data storage server on the recovery path, the data storage server further includes a metadata maintaining module 1403 configured to generate metadata information of the lost block and feed back to a metadata server.

Comparison is made below with the prior art to explain improvement of the data storage server of the distributed file system in the embodiments of the present invention over the prior-art technical solution in which the file is stored by replication.

Figure 15:
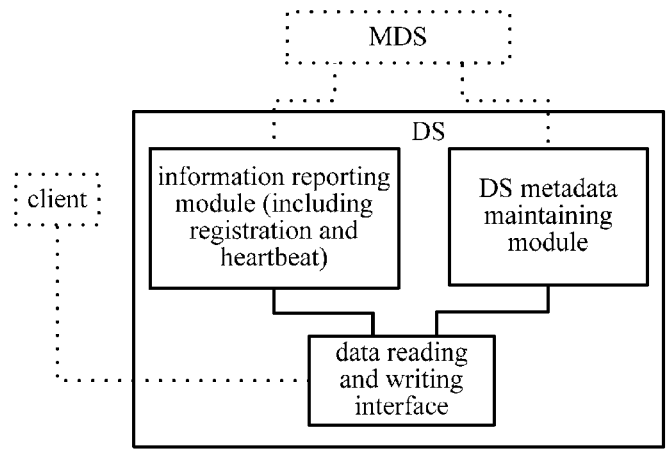
FIG. 15 is a schematic diagram exemplarily illustrating a data storage server in a technical solution in which a file is stored as a duplicate in the embodiments of the present invention.

As shown in FIG. 15, in the prior-art technical solution in which the file is stored by replication, a data storage server includes:

a data reading and writing interface, configured to receive a data block reading and writing operation request from a client, and return an operation result;

a metadata maintaining module, configured to receive data segments with identifications of application files after being divided into blocks, and maintain the identifications of these segments and storage status for correct recognition; and an information reporting module, configured to be responsible for registration operation of the DS during the DS joining a distributed file system, be responsible for heartbeats of the DS and the MDS to explain whether the current DS is operating normally or not, and be responsible for reporting to the MDS such dynamic data as CPU, storage space and network traffic of the current DS.

Figure 16:
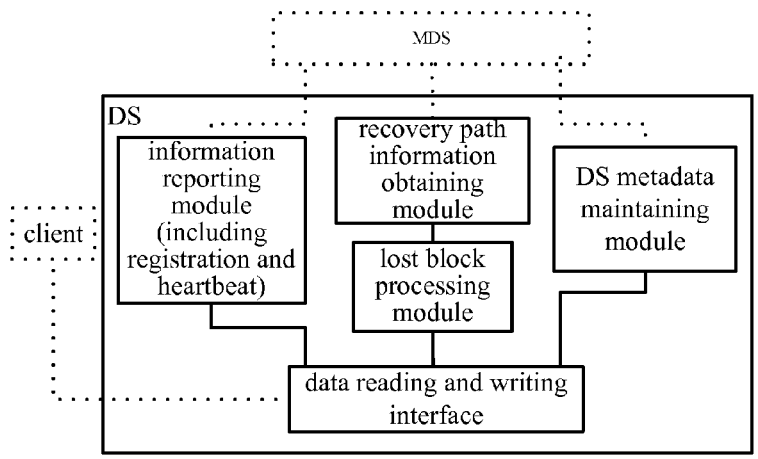
FIG. 16 is a schematic diagram exemplarily illustrating a concrete example of a data storage server in the embodiments of the present invention.

As shown in FIG. 16, the metadata server according to the embodiments of the present invention differs from that in the prior-art technical solution in which the file is stored by replication in the following aspect.

The DS according to the embodiments of the present invention is further provided with a recovery path information obtaining module and a lost block processing module for cooperation with the MDS to complete the process of failure recovery when the storage server becomes failed.

Figure 17:
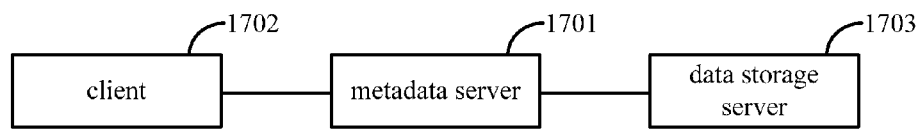
FIG. 17 is a view illustrating the structure of a distributed file system in the embodiments of the present invention.

Based on the same inventive thinking, embodiments of the present invention further provide a distributed file system, whose structure is as shown in FIG. 17. The distributed file system may include:

a metadata server 1701, configured to divide a file into at least one data group according to the size of the file, determine first mapping information from the file to the at least one data group, wherein each of the at least one data group includes content blocks of the file and a verification block, determine second mapping information from each of the at least one data group to data storage servers storing the each of the at least one data group, and send the first mapping information and the second mapping information;

a client 1702, configured to obtain the first mapping information and the second mapping information sent by the metadata server, perform content block partitioning on the file according to the first mapping information to generate content blocks of the file, generate a verification block of each of the at least one data group according to the first mapping information, and send the generated content block and verification block according to the second mapping information; and a data storage server 1703, configured to receive and store the content blocks and the verification block sent by the client.

In one embodiment, the metadata server 1701 can be further configured to determine a lost block stored in a failed data storage server according to the first mapping information and the second mapping information, select a substitute data storage server for the failed data storage server, and generate a recovery path according to a valid block in the data group to which the lost block belongs, the data storage server storing the valid block, and the substitute data storage server, wherein the recovery path is used for data storage servers on the recovery path to calculate and store the calculated lost block.

Relevant information of the recovery path is obtained by data storage servers on the recovery path.

The first data storage server on the recovery path is configured to provide a locally stored valid block as data content to the second data storage server on the recovery path.

The second data storage server on the recovery path is configured to calculate the locally stored valid block and the received data content, and provide the calculated data content to the third data storage server on the recovery path, so on and so forth, until the last data storage server on the recovery path is reached.

The last data storage server on the recovery path serves as the substitute data storage server and is configured to store the received data content as lost block.

In summary, in the embodiments of the present invention, a file is divided into at least one data group according to the size of the file, wherein each of the at least one data group includes content blocks of the file and a verification block, first mapping information from the file to the at least one data group is created, second mapping information from each of the at least one data group to data storage servers storing the each of the at least one data group is created, and the client generates content blocks of the file and the verification block of each of the at least one data group according to the first mapping information, and stores the content blocks and the verification block in a corresponding data storage server according to the second mapping information. In comparison with the prior-art technical solution in which multiple copies of a file are stored, the storage space utilization can be greatly enhanced, and construction cost of the distributed file system can be lowered while a high reliability is ensured. Moreover, since the file is divided into data groups according to the size of the file, the number of data groups is flexibly variable and the blocks are related to the file content, thus being adapted to the development demand for flexible variation of the distributed file system.

In the embodiments of the present invention, recovery of a distributed file system is realized by means of a recovery path, on which a data storage server calculates and stores a lost block without having to update the data groups, as it suffices to calculate the lost block according to a valid block in the data group, whereby it is possible to avoid great amount of reading, writing and computing operations, and to enhance usability of the distributed file system in the case the utilization ratio of the storage space of the distributed file system is relatively high and the construction cost of the distributed file system is relatively low.

With the descriptions of the above embodiments, a person skilled in the art can clearly understand that the present invention can be provided in the form of methods, systems or computer program products. Accordingly, the present invention may be implemented with hardware embodiments, software embodiments, or embodiments in which software is combined with hardware. Moreover, the present invention may have a form of a computer program product executed on one or more computer-usable storage media (including, but not limited to, magnetic disk memory, CD-ROM, optical memory, etc.) containing computer-usable program codes.

The present invention is described with reference to flowcharts and/or block diagrams of methods, devices (systems) and computer program products according to the embodiments of the present invention. As should be understood, it is possible for computer program instructions to realize each flow and/or block in the flowcharts and/or block diagrams, and combinations of flows and/or blocks in the flowcharts and/or block diagrams. These computer program instructions can be supplied to a general computer, a dedicated computer, an embedded processor or a processor of other programmable data processing device to produce a machine, enabling instructions executed by the computer or the processor of the other programmable data processing device to produce a device that realizes the functions designated by one or more flows in the flowcharts and/or one or more blocks in the block diagrams.

These computer program instructions can also be stored in a computer-readable memory capable of guiding the computer or the other programmable data processing device to operate in a specific mode, to enable instructions stored in the computer-readable memory to produce a product containing an instructing device that realizes the functions designated by one or more flows in the flowcharts and/or one or more blocks in the block diagrams.

These computer program instructions can also be loaded in the computer or the other programmable data processing device, so that a series of operational steps is executed on the computer or the other programmable device to produce processing realizable by the computer, whereby instructions executed on the computer or the other programmable device provide steps for realizing the functions designated by one or more flows in the flowcharts and/or one or more blocks in the block diagrams.

Objectives, technical solutions and advantageous effects of the present invention are described in detail in the aforementioned specific embodiments. As should be understood, the above embodiments are merely specific embodiments of the present invention, and are not used to restrict the protection scope of the present invention. Any modification, equivalent substitution, and improvement made within the spirits and principles of the present invention shall all fall within the protection scope of the present invention.

What is claimed is:

1. A method for processing files of a distributed file system, wherein the distributed file system comprises a metadata server and the method is performed by the metadata server, the method comprising:
dividing a file into at least one data group according to the size of the file, wherein the dividing comprises:
calculating a number of content blocks of the file according to the size of the file and a size of a block, and
determining the number and composition of the at least one data group according to the number of the content blocks of the file and a preset limit value of a number of blocks contained in a data group;
determining first mapping information from the file to the at least one data group, wherein each of the at least one data group includes content blocks of the file and a verification block;
determining second mapping information from each of the at least one data group to data storage servers storing each of the at least one data group; and
providing the first mapping information and the second mapping information to a client for executing a writing operation of the file;
wherein calculating the number of the content blocks according to the size of the file and a size of a block comprises:
calculating the number of the content blocks of the file according to the formula: $c=(m+b-1)/b$,
where m is the size of the file, b is the size of the block, and c is the number of the content blocks of the file;
wherein determining the number and composition of the at least one data group according to the number of the content blocks of the file and a preset limit value of the number of blocks contained in a data group comprises:

if c<k, determining that the number of the at least one data group is one, and that the data group is composed of c content blocks, k-c blank blocks and one verification block;

if c≥K, determining that the number of the at least one data group is g=(c+K−2)/(K−1) wherein the first g−1 data groups are composed of K−1 content blocks and one verification block, and the last data groups is composed of content blocks, blank blocks and a verification block, wherein the number of the content blocks is smaller than K−1, and the number of the verification block is one;

wherein (k,K) is the preset limit value of the number of blocks contained in a data group.

2. The method according to claim 1, wherein the step of determining second mapping information from each of the at least one data group to data storage servers storing each of the at least one data group comprises:
  determining that different blocks of the same data group are stored in different data storage servers; and/or
  determining that different data groups reuse a data storage server.

3. The method according to claim 1, further comprising:
  determining a lost block stored in a failed data storage server according to the first mapping information and the second mapping information;
  selecting a substitute data storage server for the failed data storage server; and
  generating a recovery path according to a valid block in the data group to which the lost block belongs, the data storage server storing the valid block, and the substitute data storage server, wherein the recovery path is used for data storage servers on the recovery path to calculate the lost block and store the calculated lost block.

4. A method for processing files of a distributed file system, the distributed file system comprises a metadata server communicable connected to a client, the method is performed by the client, and the method comprising:
  obtaining from the metadata server first mapping information from a file to at least one data group, and second mapping information from each of the at least one data group to data storage servers storing each of the at least one data group, wherein the at least one data group is formed by dividing the file according to the size of the file, and each of the at least one data group includes content blocks of the file and a verification block;
  performing content blocking on the file according to the first mapping information, to generate the content blocks of the file, the content blocking comprising:
    calculating a number of content blocks of the file according to the size of the file and a size of a block, and
    determining the number and composition of the at least one data group according to the number of the content blocks of the file and a preset limit value of the number of blocks contained in a data group,
    wherein calculating the number of the content blocks according to the size of the file and a size of a block comprises:
      calculating the number of the content blocks of the file according to the formula: c=(m+b−1)/b,
      wherein m is the size of the file, b is the size of the block, and c is the number of the content blocks of the file;
  wherein determining the number and composition of the at least one data group according to the number of the content blocks of the file and a preset limit value of the number of blocks contained in a data group comprises:

if c<k determining that the number of the at least one data group is one, and that the data group is composed of c content blocks, k−c blank blocks and one verification block;

if c≥K, determining that the number of the at least one data g=(c+K−2)/(K−1), wherein the first g−1 data groups are composed of K−1 content blocks and one verification block, and the last data groups is composed of content blocks, blank blocks and a verification block, wherein the number of the content blocks is smaller than K−1, and the number of the verification block is one;

where (k,K) is the preset limit value of the number of blocks contained in a data group;

generating the verification block of each of the at least one data group according to the first mapping information; and sending the generated content block and verification block to the data storage servers for storage according to the second mapping information.

5. The method according to claim 4, further comprising:
caching the first mapping information and the second mapping information.

6. An apparatus of a distributed file system, comprising:
a processor;
a memory;
wherein the processor executes instructions configured to:
divide a file into at least one data group according to the size of the file,
wherein dividing the file comprises:
calculating a number of content blocks of the file according to the size of the file and a size of a block, and
determining the number and composition of the at least one data group according to the number of the content blocks of the file and a preset limit value of a number of blocks contained in a data group, and determine first mapping information from the file to the at least one data group, wherein each of the at least one data group includes content blocks of the file and a verification block;
wherein calculating the number of the content blocks according to the size of the file and a size of a block comprises:
calculating the number of the content blocks of the file according to the formula: C=(m+b−1)/b,
wherein m is the size of the file, b is the size of the block and c is the number of the content blocks of the file;
wherein determining the number and composition of the at least one data group according to the number of the content blocks of the file and a preset limit value of the number of blocks contained in a data group comprises:
if c<k, determining that the number of the at least one data group is one, and that the data group is composed of c content blocks, k−c blank blocks and one verification block;
if c>K, determining that the number of the at least one data group is g=(c+K−2)/(K−1), wherein the first g−1 data groups are composed of K−1content blocks and one verification block, and the last data group is composed of content blocks, blank blocks and a verification block, wherein the number of the content blocks is smaller than K-1 and the number of the verification block is one;
wherein (k, K) is the preset limit value of the number of blocks contained in a data group; and,
wherein the processor executes further instructions configured to determine second mapping information from each of the at least one data group to data storage servers storing each of the at least one data group; and provide the first mapping information and the second mapping information to a client for executing a writing operation of the file.

7. The apparatus according to claim 6, wherein the further instructions configured to determine second mapping information are specifically configured to, while determining second mapping information from each of the at least one data group to data storage servers storing each of the at least one data group, determine that different blocks of the same data group are stored in different data storage servers; and/or determine that different data groups reuse a data storage server.

8. The apparatus according to claim 6, wherein the processor executes further instructions configured to:
   determine a lost block stored in a failed data storage server according to the first mapping information and the second mapping information;
   select a substitute data storage server for the failed data storage server; and
   generate a recovery path according to a valid block in the data group to which the lost block belongs, the data storage server storing the valid block, and the substitute data storage server, wherein the recovery path is used for data storage servers on the recovery path to calculate the lost block and for the substitute data storage server to store the calculated lost block.

9. An apparatus of a distributed file system, wherein the apparatus is communicably connected to a metadata server, the apparatus comprising:
   a processor;
   a memory;
   wherein the processor executes instructions configured to obtain from the metadata server first mapping information from a file to at least one data group and second mapping information from each of the at least one data group to data storage servers storing each of the at least one data group, wherein the at least one data group is formed by dividing the file according to a size of the file, wherein the dividing comprises:
   calculating a number of content blocks of the file according to the size of the file and a size of a block, and
   determining the number and composition of the at least one data group according to the number of the content blocks of the file and a preset limit value of a number of blocks contained in a data group,
   wherein each of the at least one data group includes content blocks of the file and a verification block, and perform content block partitioning on the file according to the first mapping information to generate the content blocks of the file;
   wherein calculating the number of the content blocks according to the size of the file and a size of a block comprises: calculating the number of the content blocks of the file according to the formula: $c=(m+b-1)/b$,
   where m is the size of the file, b is the size of the block and c is the number of the content blocks of the file;
   wherein determining the number and composition of the at least one data group according to the number of the content blocks of the file and a preset limit value of the number of blocks contained in a data group comprises:
   if $c<k$, determining that the number of the at least one data group is one, and that the data group is composed of c content blocks, k–c blank blocks and one verification block;
   if $c>K$, determining that the number of the at least one data group is $g=(c+K-2)/(K-1)$, wherein the first g–1 data groups are composed of K–1, content blocks and one verification block, and the last data group is composed of content blocks blank blocks and a verification block wherein the number of the content blocks is smaller than K–1 and the number of the verification block is one;
   where (k,K) is the preset limit value of the number of blocks contained in a data group; and
   wherein the processor executes further instructions configured to generate the verification block of each of the at least one data group according to the first mapping information; and
   wherein the processor executes further instructions configured to send the generated content block and verification block to the data storage servers for storage according to the second mapping information.

10. The apparatus according to claim 9,
    wherein the processor executes further instructions configured to cache the first mapping information and the second mapping information.

11. An apparatus, comprising a metadata server, a client and a data storage server, wherein the metadata server comprises a processor; and a memory;
    wherein the processor executes instructions configured to:
    divide a file into at least one data group according to the size of the file, wherein dividing the file comprises:
    calculating a number of the content blocks of the file according to the size of the file and a size of a block, and
    determining the number and composition of the at least one data group according to the number of the content blocks of the file and a preset limit value of a number of blocks contained in a data group,
    determine first mapping information from the file to the at least one data group, wherein each of the at least one data group includes content blocks of the file and a verification block;
    determine second mapping information from each of the at least one data group to data storage servers storing each of the at least one data group, and
    send the first mapping information and the second mapping information to the client;
    wherein calculating the number of the content blocks according to the size of the file and a size of a block comprises:
    calculating the number of the content blocks of the file according to the formula: $C=(m+b-1)/b$,
    wherein m is the size of the file, b is the size of the block and c is the number of the content blocks of the file;
    wherein determining the number and composition of the at least one data group according to the number of the content blocks of the file and a preset limit value of the number of blocks contained in a data group comprises:
    if $c<k$, determining that the number of the at least one data group is one, and that the data group is composed of c content blocks, k–c blank blocks and one verification block;
    if $c>K$, determining that the number of the at least one data group is $g=(c+K-2)/(K-1)$, wherein the first g–1 data groups are composed of K–1 content blocks and one verification block, and the last data group is composed of content blocks, blank blocks and a verification block, wherein the number of the content blocks is smaller than K–1 and the number of the verification block is one;
    wherein (k,K) is the preset limit value of the number of blocks contained in a data group;
    wherein the client comprises a processor and a memory, and wherein the client processor executes instructions configured to obtain the first mapping information and the second mapping information sent by the metadata server, perform content block partitioning on the file according to the first mapping information to generate content blocks of the file, generate a verification block of each of the at least one data group according to the first mapping information, and send the generated content block and verification block according to the second mapping information; and wherein the data storage server comprises a processor and a memory, and wherein the data storage processor executes instructions configured to receive and store the content blocks and the verification block sent by the client.

12. The distributed file system according to claim 11, wherein the metadata server is further configured to:
determine a lost block stored in a failed data storage server according to the first mapping information and the second mapping information, select a substitute data storage server for the failed data storage server, and generate a recovery path according to a valid block in the data group to which the lost block belongs, the data storage server storing the valid block, and the substitute data storage server, wherein the recovery path is used for data storage servers on the recovery path to calculate the lost block and store the calculated lost block.

13. The distributed file system according to claim 12, wherein,
a data storage server on the recovery path is configured to obtain relevant information of the recovery path;
the first data storage server on the recovery path is configured to provide a locally stored valid block as data content to the second data storage server on the recovery path;
the second data storage server on the recovery path is configured to calculate the locally stored valid block and the received data content, and provide the calculated data content to the third data storage server on the recovery path, so on and so forth, until the last data storage server on the recovery path is reached; and
the last data storage server on the recovery path serves as the substitute data storage server and is configured to store the received data content as a lost block.

* * * * *